United States Patent

[11] 3,622,167

[72] Inventor Arthur E. Velthoven
Warren, Mich.
[21] Appl. No. 9,673
[22] Filed Feb. 9, 1970
[45] Patented Nov. 23, 1971
[73] Assignee Federal Screw Works
Detroit, Mich.

[54] SEALING FASTENER ASSEMBLY
6 Claims, 12 Drawing Figs.

[52] U.S. Cl. .................................................. 277/166,
277/212 C, 85/1, 151/7
[51] Int. Cl. .................................................. F16j 15/10,
F16b 43/00
[50] Field of Search ......................................... 297/166,
212 C; 85/1 JP, 50, 62; 151/7, 37, 38

[56] References Cited
UNITED STATES PATENTS

| | | | |
|---|---|---|---|
| 3,218,906 | 11/1965 | Dupree .......................... | 277/166 X |
| 3,220,453 | 11/1965 | Greeno .......................... | 151/7 |
| 3,469,492 | 9/1969 | Dahl .............................. | 85/62 |
| 3,471,158 | 10/1969 | Solins ........................... | 277/166 X |
| 3,500,712 | 3/1970 | Wagner ......................... | 85/1 JP |

Primary Examiner—Samuel B. Rothberg
Attorney—Harness, Dickey & Pierce

ABSTRACT: A sealing fastener assembly in which a generally washer-shaped plastic seal is snap fitted over the flange of a threaded metal fastener such as a nut, screw or bolt. When the fastener is tightened, the seal is extruded into engagement with the fastener threads to seal the fastened joint against fluid leakage. In one form of the invention, the outer periphery of the seal is caused to roll upwardly to expose a dissimilarly colored area of the seal and thereby indicate that the fastener has been properly tightened.

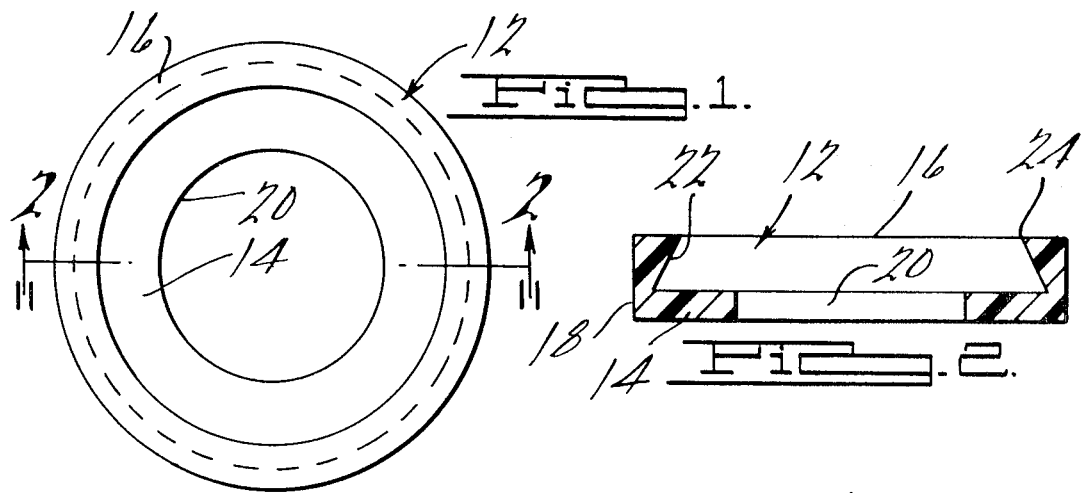
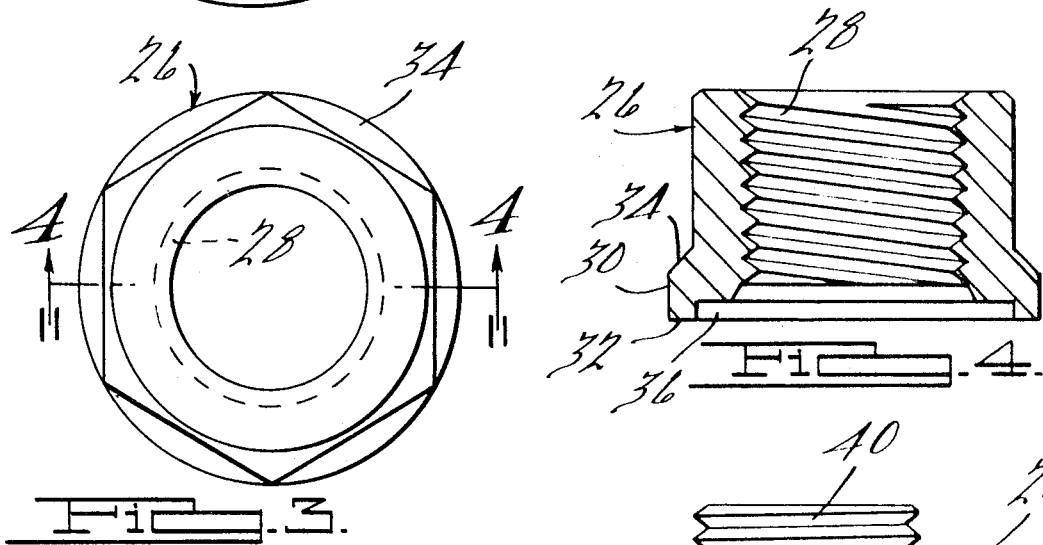
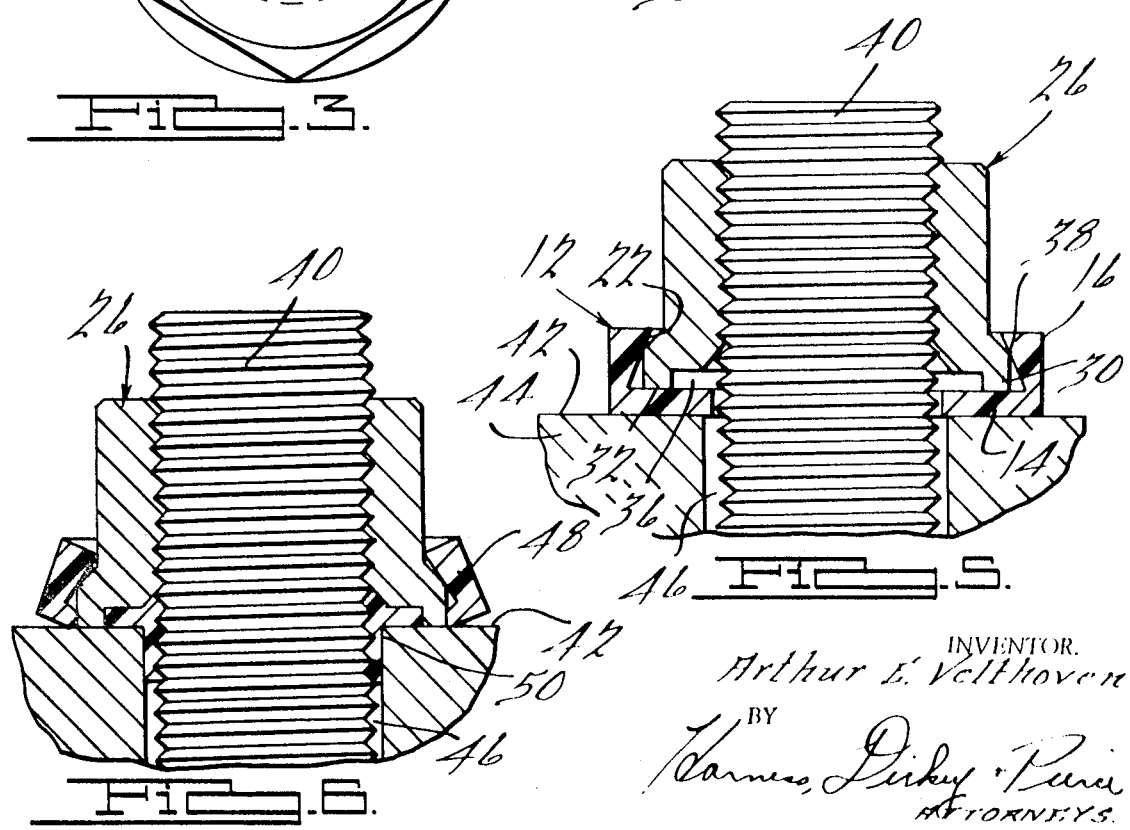

3,622,167

1

SEALING FASTENER ASSEMBLY

SUMMARY OF THE INVENTION

A variety of plastic seals have been proposed for use with metal nuts, bolts, screws and the like. The use of such seals, however, has not been too convenient and the seal has frequently become separated from the fastener during shipment or installation. Furthermore, such seals have been generally of the type which are hidden from view by the fastener and it has not been possible to determine visually whether the seal is present in a fastened joint. The assembly of the present invention has been designed to overcome such problems and to provide a sealing fastener assembly wherein the seal and fastener are shipped to the user as an assembly that can be installed in a highly convenient manner and without risk of the fastener and seal becoming disassociated.

It is still another object of the present invention to provide a fastener assembly which assures an adequate flow of plastic to insure a fluidtight seal between the threads of a fastened joint and which is otherwise highly reliable in performing its intended function.

It is still another object of the present invention to provide a fastener assembly which will give a visual indication of the presence or the seal in the assembly and also of the proper tightening of the fastener.

It is another object of the present invention to provide a fastener assembly of the foregoing character which may be inexpensively fabricated and assembled, which is of simple yet sturdy construction and which is convenient to use.

DESCRIPTION OF THE VIEWS OF THE DRAWINGS

FIG. 1 is a plan view of the seal portion of a fastener assembly of the present invention.

FIG. 2 is a sectional view of the structure illustrated in Fig. 1 taken along the line 2—2 thereof;

FIG. 3 is a plan view of a fastener portion of a fastener assembly of the present invention;

FIG. 4 is a sectional view of the structure illustrated if FIG. 3 taken along the line 4—4 thereof, FIG. 5 is a vertical sectional view of a fastener assembly made from the parts illustrated in FIGS. 1 to 4, the fastener assembly being shown threaded loosely into a structure to be fastened;

FIG. 6 is a sectional view of the structure of FIG. 5, but with the fastener being fully tightened;

Referring now to the drawings, FIGS. 1 and 2 illustrate a resinous plastic seal 12 having an annular generally washer-shaped sealing portion 14 and an annular retainer portion 16 which projects upwardly from the outer periphery 18 of the sealing portion 14. The sealing portion 14 has a central opening 20 of a diameter larger than the thread diameter of the fastener with which it is to be used. The retainer portion 16 possesses a cone-shaped inner wall 22 which tapers upwardly and inwardly to an upper end opening 24. The seal 12 is preferably made from a high-density polyethylene.

Figures 7, 8:
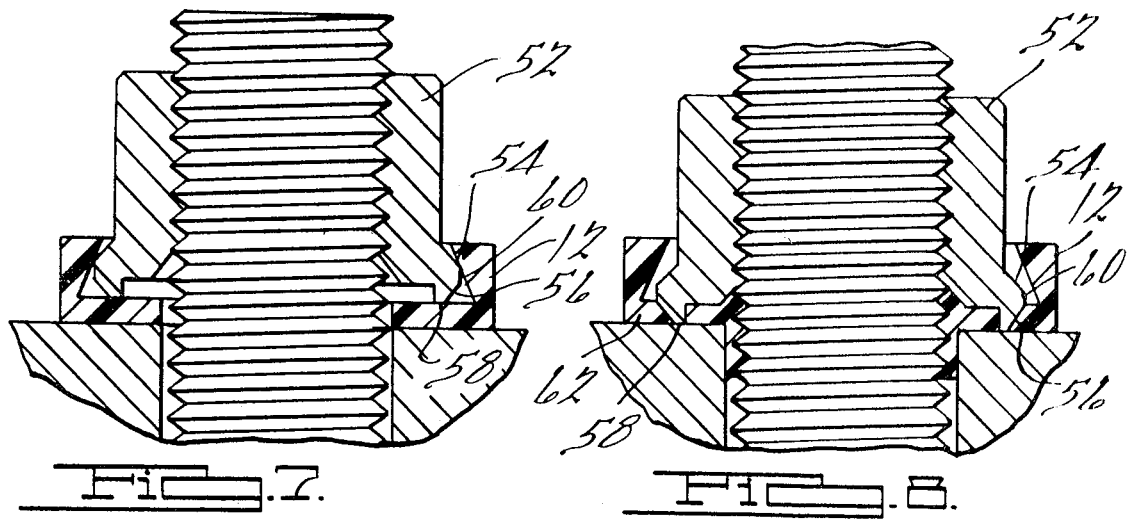
FIG. 7 is a view of structure similarly illustrated in FIG. 5, illustrating a somewhat modified form of the invention.
FIG. 8 is a view of the structure illustrated in FIG. 7 but with the fastener shown fully tightened.

The seal 12 is used in conjunction with a rigid metallic fastener body 26 which is representatively illustrated in FIGS. 3 and 4 as a nut. The nut 26 has a thread 28 extending axially therethrough and a flange 30 at its lower end. The flange 30 has a seat 32 on its lower side and tapered annular shoulder 34 on its upper side. An annular recess 36 is formed on the lower end of the nut 26 between the thread 28 and the seat 32.

2

FIGS. 5 and 6 show the seal 12 assembled to the nut 26 to form a fastener assembly according to the present invention. The assembly of the parts together is accomplished by forcing the flange 30 into the seal retainer portion 16 so that an annular edge 38 of the flange contacts and is trapped by the conical wall 22. During the assembly, first one side of the flange 30 is inserted into the retainer portion 16 to permit the flange to wedge opposite sides of the retainer portion apart until the wall 22 snaps over the edge 38.

FIG. 5 shows the fastener assembly threaded on a screw or stud 40, but before the nut 26 has been tightened against an abutment surface 42 of a structural member 44 to be secured. FIG. 6 illustrates the condition of the parts after the nut 26 has been fully tightened and seated.

The threaded joint illustrated in FIGS. 5 and 6 includes an opening 46 in the member 42 through which the stud 40 projects. It will be seen that a radial clearance exists between the wall of the opening 46 and the stud 40. When the nut 26 is tightened, the sealing portion 14 is compressed against the surface 42 by the nut seat 32 and the seat 32 bites into the sealing portion until it severs the sealing portion. This leaves a radially outer part 48 of the sealing member 12 surrounding the flange 30 and a radially inner part 50 of the sealing member which has been extruded or deformed radially inwardly by the recessed seat 32. The seal inner part 50 fills the recess 36 and flows into engagement with the threads of the stud 40 and the nut thereof. The seal inner part 50 also fills the clearance space between the stud 40 and the wall of the opening 46. By this means, the seal inner part 50 forms a seal for the opening 46 to prevent the flow of fluid out of the opening 46 around the stud 40.

The severed radially outer portion 48 of the fastener 12, which is illustrated in FIG. 6, will either fall off of the joint of its own accord or is readily removed from the fastener body 26. The severing of the seal can serve as an indication to the workman that the nut has been properly tightened.

FIGS. 7 and 8 illustrate a slightly modified form of the invention utilizing the same seal 12 and a slightly modified nut 52. The nut 52 has a flange 54 provided with a chamfer 56 located between its seat 58 and the flange's outer periphery 60. As illustrated in FIG. 8, the chamfer 56 will overlie part of the radially outer portion 62 of the severed sealing member 12 to hold the portion 62 on the nut 52. This provides a visible indication that the joint has been sealed.

Figures 9, 10:
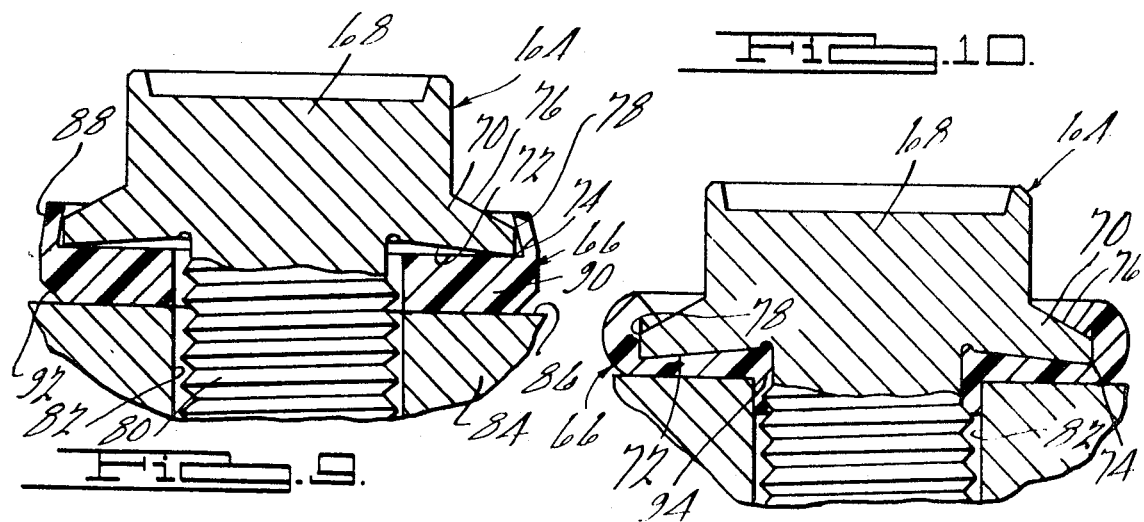
FIG. 9 is a view of structure similarly illustrated in FIG. 5, showing still another form of the present invention.
FIG. 10 is a sectional view of the structure illustrated in FIG. 9 but with the fastener shown in its tightened condition.

FIGS. 9 and 10 illustrate still another form of the present invention consisting of a screw 64 and seal 66. The screw 64 has a head 68 provided with a flange 70. The lower surface 72 of the flange 70 is of segmentally conical shape and tapers upwardly and inwardly from the outer edge 74 thereof. The upper surface 76 of the flange 70 is also segmentally conical and tapers downwardly and outwardly to a peripheral edge 78. The screw 64 is, of course, provided with a threaded shank 80 which is shown projecting into the opening 82 of a structural member 84 to be fastened. A flat abutment surface 86 is formed on the upper side of the structural member 84 and surrounds the upper end of the opening 82. It will be noted that clearance exists between the threaded shank 80 and the wall of the opening 82.

The seal 66 is retained on the flange 70 by means of an annular retainer portion 88. The seal 66 also has a generally washer-shaped sealing portion 90 which lies in flat engagement with the abutment surface 86. It will be noted that the sealing portion 90 is relatively thick compared to the comparable portions of the prior embodiments of the invention. Furthermore, the outer periphery of the sealing portion 90 has a chamfer 92 at its lower edge. The seal is made from high-density polyethylene. The retainer portion 88 is upwardly and inwardly inclined and is snap fitted over the edge 78 of the screw flange 70.

The seal 66 has its chamfer 92 colored dissimilarly to the remaining outer peripheral portion thereof. When the screw 68 is tightened to the position illustrated in FIG. 10, the sealing portion 66 is highly compressed and is deformed both radially outwardly and inwardly. The inward deformation of the sealing portion 66 forms a part 94 thereof which lies in the clearance space between the threaded shank 80 and the wall of the opening 82. The radially outward deformation of the seal portion 66 displaces the chamfer 94 so that it faces upwardly and outwardly. While the flange 70 does not sever the sealing portion 66 as in the prior embodiments, the position of the chamfer 92 may be observed and the displacement of the chamfer 92 to a readily visible position will indicate to a workman or inspector that the screw 68 has been properly tightened.

Figures 11, 12:
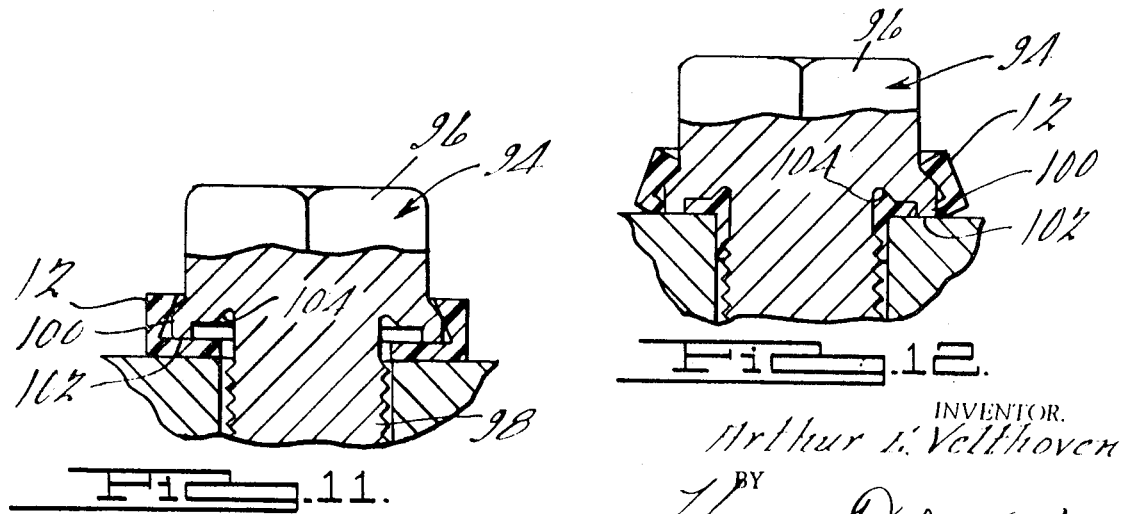
FIG. 11 is a view of structure similarly illustrated in FIG. 5, showing still another form of the present invention.
FIG. 12 is a sectional view of the structure illustrated in FIG. 11 but with the fastener being fully tightened.

FIGS. 11 and 12 illustrate a form of the invention that is quite similar to the embodiment of FIGS. 1–6. In this embodiment of the invention, however, a fastener in the form of a screw 94 is employed. The screw 94 has a head 96 and a threaded shank 98. The screw head 96 is provided with a flange 100 on which the seal 12 is snap fitted. A seat 102 of the flange 100 severs the seal 12 just as the flange 30 of the embodiment of FIGS. 1–6 severed the seal 12. A recess 104 in the flange 100 permits radially inward flow of the seal 12 to achieve the desired sealing function.

What is claimed is:

1. A sealing fastener assembly including a hard metallic fastener body having a thread, a radially outwardly projecting annular flange having a seat adjacent the outer periphery of said body and an annular recess extending radially between one end of said thread and said seat, and an extrudable resinous plastic seal having an annular sealing portion and a retainer portion projecting axially from said sealing portion and snap fitted over said flange to hold said seal on said body with said sealing portion adjacent said seat, said seat being operable to sever said sealing portion and radially inwardly displace a part of said sealing portion through said recess into engagement with said thread upon the tightening of said fastener assembly against an abutment surface.

2. The structure set forth in claim 1 in which said fastener body comprises a nut.

3. The structure set forth in claim 1 in which said fastener body comprises a screw.

4. The structure set forth in claim 1 in which said retainer portion comprises a continuous collar extending upwardly and inwardly from said sealing portion.

5. The structures set forth in claim 1 in which said flange is provided with an undercut outer peripheral portion operable to hold a severed outer part of said sealing portion against the abutment surface subsequent to the severing of said sealing portion by said seat.

6. The structure set forth in claim 1 in which said seal comprises a unitary polyethylene molding.

* * * * *